United States Patent
Ronlan

(10) Patent No.: US 9,381,543 B2
(45) Date of Patent: Jul. 5, 2016

(54) SURFACE TREATMENT OF RUBBER USING LOW PRESSURE PLASMA

(75) Inventor: Alvin Ronlan, Stockholm (SE)

(73) Assignee: Münch Chemie International GmbH, Weinheim (DE)

( * ) Notice: Subject to any disclaimer, the term of this patent is extended or adjusted under 35 U.S.C. 154(b) by 0 days.

(21) Appl. No.: 13/805,863

(22) PCT Filed: Jun. 7, 2011

(86) PCT No.: PCT/EP2011/059333
§ 371 (c)(1),
(2), (4) Date: Jan. 28, 2013

(87) PCT Pub. No.: WO2011/160939
PCT Pub. Date: Dec. 29, 2011

(65) Prior Publication Data
US 2013/0129850 A1    May 23, 2013

(30) Foreign Application Priority Data
Jun. 25, 2010 (EP) .................................. 10167306

(51) Int. Cl.
| | |
|---|---|
| *B29C 41/00* | (2006.01) |
| *B05D 1/00* | (2006.01) |
| *B29C 59/14* | (2006.01) |
| *B29D 30/06* | (2006.01) |
| *C08J 7/12* | (2006.01) |

(52) U.S. Cl.
CPC . *B05D 1/62* (2013.01); *B29C 59/14* (2013.01); *B29D 30/0645* (2013.01); *C08J 7/123* (2013.01); *B29C 59/142* (2013.01); *B29C 2791/005* (2013.01); *B29C 2791/006* (2013.01); *C08J 2321/00* (2013.01); *Y10T 428/31938* (2015.04)

(58) Field of Classification Search
CPC ......... B05D 1/62; B29C 59/14; B29C 59/142
USPC ...................... 264/483, 455; 425/52; 427/569
See application file for complete search history.

(56) References Cited

U.S. PATENT DOCUMENTS

| | | | |
|---|---|---|---|
| 4,214,014 A | | 7/1980 | Hofer et al. |
| 5,026,515 A | * | 6/1991 | Hasegawa et al. ............ 264/315 |
| 5,198,033 A | | 3/1993 | Kelley et al. |

(Continued)

FOREIGN PATENT DOCUMENTS

| | | |
|---|---|---|
| KR | 20070035318 A  *  3/2007 | |
| WO | 00/01528 A1 | 1/2000 |

OTHER PUBLICATIONS

English machine translation of KR 20070035318, retrieved from KIPO database Nov. 9, 2015.*

*Primary Examiner* — Timothy Kennedy
(74) *Attorney, Agent, or Firm* — Nixon Peabody LLP

(57) ABSTRACT

A method of treating a surface of an object comprising a rubber material and in particular a bladder for use in a process for making a vehicle tire. The method comprises subjecting the surface to a gas at a low pressure at which the gas is susceptible of forming plasma, and causing the gas to form plasma. In order to obtain repellent properties of the surface of the rubber material fluorine gas such as tetrafluormethane or hexafluorethane is used. Preferably the treatment is performed until there is obtained a surface layer of the rubber material with properties modified by the treatment having an expected lifetime corresponding to the expected lifetime of the object.

5 Claims, 1 Drawing Sheet

(56) References Cited

U.S. PATENT DOCUMENTS

| | | | |
|---|---|---|---|
| 5,658,512 A * | 8/1997 | Nobata et al. | 264/130 |
| 6,013,153 A * | 1/2000 | Koinuma et al. | 156/272.6 |
| 6,488,992 B1 | 12/2002 | Boerio et al. | |
| 2009/0289396 A1 * | 11/2009 | Walters | 264/483 |

* cited by examiner

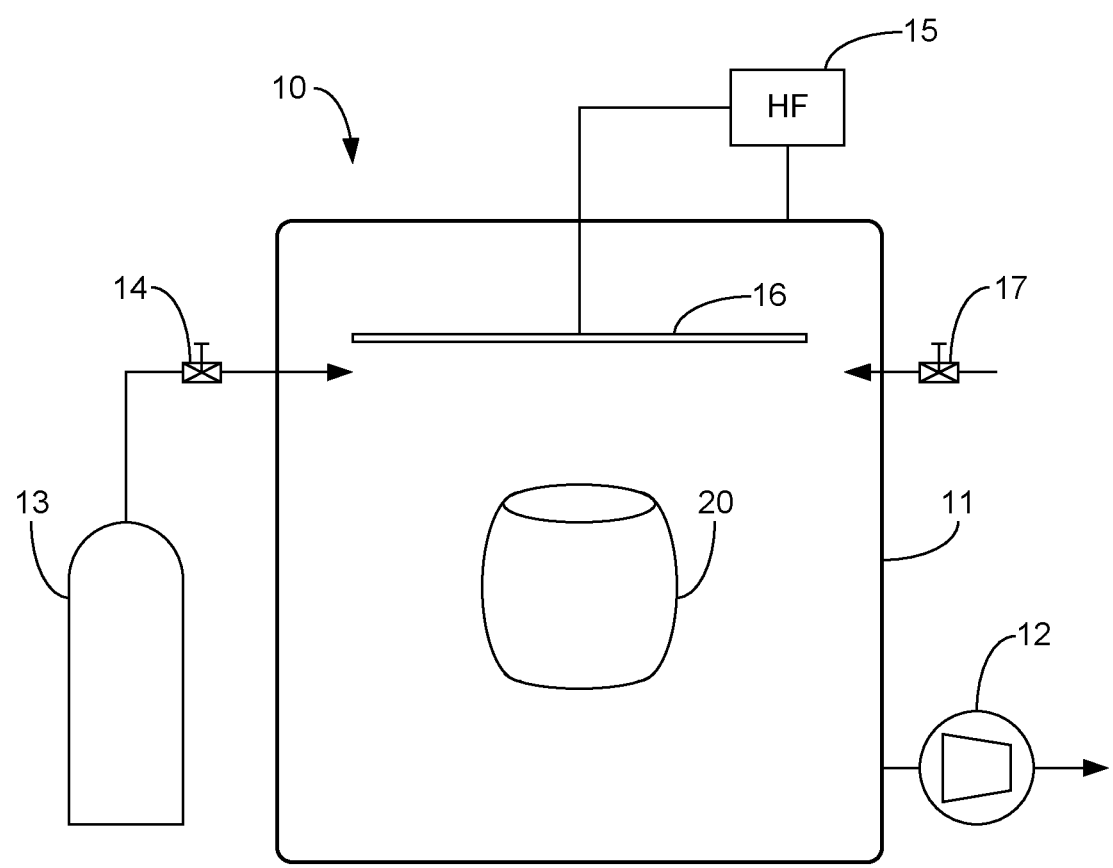

SURFACE TREATMENT OF RUBBER USING LOW PRESSURE PLASMA

CROSS-REFERENCE TO RELATED APPLICATIONS

This application is a U.S. National Stage of Inernational Application No. PCT/EP2011/059333, filed Jun. 7, 2011, which claims the benefit of European Patent Application No. 10167306.9, filed on Jun. 25, 2010, both of which are incorporated herein by reference in their entireties.

FIELD OF THE INVENTION

The invention relates to surface treatment of substances using low pressure plasma, and in particular to treatment of surfaces of rubber for modifying the surface in order to obtain certain desired surface properties.

BACKGROUND OF THE INVENTION

In the manufacture of all kinds vehicle tyres a tyre blank or "green tyre" comprising several layers of unvulcanized rubber compounds is placed in a metal mould that produces the outer contour i.e. the profile, the sidewall geometry and the tread pattern of the tyre. In order to press the unvulcanized tyre blank into the metal mould contour a bladder is placed inside the green tyre and pressurised with hot steam. By means of the pressurised hot steam the bladder presses the green tyre into the cavity of the mould and heats the green tyre and thereby causes it to vulcanize. The bladder usually consists of rubber. Depending on tyre size and tyre type this process may take about 20-30 minutes.

In order to prevent the green tyre to adhere to the bladder during the vulcanization process a release agent is applied to the surface of the bladder that comes into contact with the green tyre. If no or insufficient release agent is applied to the bladder it may be difficult or impossible to separate the bladder from the vulcanized tyre. A bladder may be used for producing about 400-600 tyres, after which it due to strength and aging reasons, is replaced and discarded.

Release agents consisting based on silicone or talc are frequently used. In practice release agent will have to be applied again after a few, say 4-6, vulcanizations, because some of the release agent on the bladder is transferred to the inside (inner liner) of the resulting tyre.

Release agent left on the inside of a tyre may cause problems, in particular if e.g. a substance or part is later to be applied to the inner liner.

Examples of such substances are sealing substances for repair and sealing of punctures. This only works if there is no release agent on the inner liner.

Another example are measuring equipment, e.g. for temperature measuring of the tyre.

Therefore, the surface of the inner liner is cleaned using expensive and high energy consuming processes and polluting cleaning agents. But even washing works only with certain release agents and then only unsatisfactory.

Another example is that some automobile manufacturers adhere strips of acoustic foam on the inner liner in order to reduce tyre noise. This is currently only possible if the area to which the foam will be glued is mechanically roughened which may damage the inner liner.

The applicant has developed methods and substances, e.g. jelly or thixotropic substances, for being applied to the inner liner of a tyre for the purpose of balancing the tyre and/or the wheel on which the tyre is mounted. In order to confine such substances ribs are applied to the inner liner and it is necessary to clean the inner liner and remove any release agent before applying the ribs.

Various measures have been tested and applied such as
Cleaning with solvents
Cleaning with high pressure cleaner
Application of a primer
Mechanical roughening of the inner liner.

Plasma treatment of thermoplastic materials and elastomers are known. However, for the purpose of modifying the surfaces such that other materials such as paint and other surface treatment will adhere very well afterwards. A typical example is the automotive industry where e.g. body parts such as bumpers are treated with low-pressure plasma to obtain good adherence of paint to the body part. These bumpers are typically made of PP or EPDM, and no other material will adhere well to these materials, and bumpers of these materials can not normally be durably painted. Through low pressure plasma treatment their surfaces are modified so that paint adheres well. Such modifications are normally performed in oxygen plasma.

U.S. Pat. No. 6,488,992 discloses that elastomeric seals, including O-rings, may have chemically resistant thin films applied by the technique of plasma polymerization to the surface of the elastomer, enhancing wear resistance and environmental resistance without changing the physical properties of the elastomer. The films may be a silane polymer applied by plasma deposition in a radio frequency/microwave dual power source reactor.

U.S. Pat. No. 5,198,033 discloses a plasma treatment apparatus for treating strip-stock material, such as tubing, wire, webs, and the like, by moving the strip-stock through a plasma treatment region of the apparatus provides improved consistency of surface treatment if the tension on the material is maintained within a predetermined range.

U.S. patent application 2009/289396 discloses a method for recycling polymeric materials, particularly cured rubber such as may be derived from tyres and the like, including obtaining solid polymer material in particulate form derived from a previous artifact or product. The polymer particles are exposed to a fluid treatment medium which chemically modifies the particle surfaces to provide chemically activated particle surfaces, while maintaining polymer properties in the particle interiors. The surface activated polymer particles are combined with a flowable binder or matrix material. The binder or matrix material is then cured, dried or set in intimate contact with the surface-activated polymer particles to form a body of material incorporating the recycled polymer particles with the surfaces bonded to the cured, dried or set binder or matrix material. In this way, large proportions of particulate material can be recycled into new products which exhibit good performance, e.g. elastomeric performance.

U.S. Pat. No. 4,214,014 discloses surface treatment for hard or dehydrated hydrophilic contact lenses, to reduce the deposit of impurities thereon, comprising subjecting the lens, after shaping and polishing, to a gas discharge, e.g. in an oxygen atmosphere.

WO 00/01528 A1 provides methods for chemically modifying particular surfaces using plasma surface modification. A method for preparing footwear having at least two components involves chemically modifying the surface of a component using plasma surface modification. The modified component surface is then adhered to a surface of another component. Functionalities that are added to the component surface by this technique include chlorine, oxygen and amine functionalities. The adhesion of a substrate is enhanced by chemically modifying a surface of the substrate using plasma surface modification to include chlorine and oxygen-containing functionalities, chlorine and amine functionalities, or amine and oxygen functionalities.

SUMMARY OF THE INVENTION

The invention provides a method of modifying the surface of the bladders and surfaces of other objects comprising a rubber material using low-pressure plasma. For producing the low-pressure plasma preferably a fluorine gas is used, such as tetrafluormethane and hexafluorethane at low pressure such as 0.3 mbar.

This method gives the rubber surface highly repellent properties for the contact with other materials. Especially a rubber bladder for use in the production of vehicle tyres can be treated using the method of the invention to obtain highly repellent properties so that when in contact with the rubber mixture of the inner liner of the green tyres there will be no or little adherence and the bladder can be separated from the vulcanized tyre.

Because fluorine gas is used as plasma gas the surface of the rubber material is deactivated, so that other materials will not adhere. These surface modifications by plasma gases are possible only in a very thin surface layer, usually in a layer thickness in the nanometre range. Experiments show, however, that such thicknesses are sufficient at least for treating the surface of a bladder for use in the manufacture of vehicle tyres. Vulcanisation tests were conducted at usual production parameters and it was found that the same repellent effect was still experienced even after 500 test vulcanizations, which corresponds to the life time of a bladder.

By using bladders treated by the method of the invention tyre manufacturers will avoid the repeated manual process of coating the bladders with release agents at about every fifth tyre produced. Thus the invention saves labour and time, the use of release agents is avoided. And there is no pollution of the working place and the manufacturing machine as well as the environment. The complex processes of removing release agent from the inner lining which may sometimes be unsatisfactory are also avoided.

BRIEF DESCRIPTION OF THE DRAWING

The FIGURE illustrates schematically a system used for performing the method of the invention.

DETAILED DESCRIPTION OF THE INVENTION

Throughout this specification the word "comprise" or variations such as "comprises" or "comprising", will be understood to imply the inclusion of a stated element, integer or step, or group of elements, integers or steps, but not the exclusion of any other element, integer or step, or group of elements, integers or steps.

In the FIGURE is shown a system 10 with an airtight chamber 11 having a volume that is sufficient for receiving one or more objects to be treated. An evacuation pump 12 is coupled to the chamber 11 and can be controlled to evacuate the chamber 11. A gas supply, e.g. in the form of a metal container 13, is provide for supplying a gas that is susceptible of forming a plasma, through a controllable gas inlet valve 14 to the chamber 11. A high frequency generator 15 can be controlled to generate a high frequency electrical signal and to feed the high frequency electrical signal to an electrode 16 inside the chamber 11 so as to cause the gas in the chamber to form a plasma. A low pressure of the gas suitable for forming and maintaining the plasma in the chamber 11 is established and maintained by proper operation of the evacuation pump 12 and/or the gas inlet valve 14. An air inlet valve 17 is provided for letting atmospheric air into the chamber 11.

An example of a system 10 that may be used for performing the method of the invention is the system TETRA-150-LF-PC available from Diener electronic GmbH+Co. KG, Nagolderstrasse 61, D-72224 Ebhausen, Germany. For smaller parts their system TETRA 30 series can be used. Of course special designed and build low pressure plasma apparatuses or apparatuses from other suppliers can be used as well.

Another example of a system 10 that may be used for performing the method of the invention is their system TF 5000 PC.

The FIGURE also shows an object 20 to be treated in the system. The object 20 shown is a bladder for use in a process for making vehicle tyres. The bladder comprises a rubber material with a surface to be treated to obtain the desired repellent properties to prevent adhesion to the inner liner of the tyres that are produced using the bladder. Other rubber objects may also be treated to obtain repellent properties.

When the object 20 is placed in the chamber 11 the evacuation pump 12 is controlled to evacuate the air from the chamber. When a suitable low pressure is obtained in the chamber the gas inlet valve 14 is controlled to open and let gas from the gas supply container 13 into the chamber 11. In this example where the object 20 to be treated is a bladder comprising a rubber material the gas comprises a fluorine gas such as tetrafluormethane or hexafluorethane or a mixture thereof, and the pressure should be low, such as 0.3 mbar.

Another gas may comprise a fluorine gas such as tetrafluormethane or hexafluorethane, nitrogen trifluoride ($NF_3$) or a mixture thereof. The pressure should be low, such as approximately 0.3 mbar to 0.5 mbar.

The high frequency generator 15 will then be controlled to generate a high frequency electrical signal which is fed to the electrode 16 inside the chamber 11, and an electromagnetic field will be generated in the chamber. The frequency of the high frequency electrical signal is suitable to cause the fluorine gas in the chamber to form plasma and can be in the kHz, MHz or GHz range.

The treatment time depends on the desired result and on the strength of the electromagnetic field. The fluorine gas plasma modifies the surface of the object in a thickness in the nanometre range. In the case the object is a bladder it is preferred to obtain a thickness of the modified surface layer that can last the expected lifetime of the bladder under the expected working conditions. Tests conducted on samples corresponding to commercially used bladders have indicated that it is possible to obtain durable repellent properties that will last for several hundreds of vulcanizations of vehicle tyres i.e. corresponding to the lifetime of commercially used bladders. This means that bladders will not need any repeated or "top-up" treatment during its expected lifetime and that only an initial treatment will be necessary. Tests in a commercial system as mentioned above indicate that a treatment time less than one hour will be sufficient.

Other tests indicate that a treatment time of 45 minutes will be sufficient.

Since the plasma treated bladder will be inflated, this means is stretched, during the tyre production process, the low pressure plasma treated area of the bladder will be stretched too and gets thinner by the stretching. An improvement here is to plasma treat the bladder in a stretched position, this means placing the bladder in a stretched form in the chamber 11 and to run the plasma treating process with the stretched bladder. The stretching can be done by mechanical means. In this case, a mechanical stretching device has to be used, which stretches the bladder in the same or in a similar way as it occurs with the bladder during the tyre manufacturing process. Stretching can also be done by air or gas pressure inside the bladder. In this case, the openings of the bladder have to be closed by closing devices. With an air inlet at the closing devices, air or gas pressure can be applied to the bladder in order to stretch the bladder in the same way as it occurs with the bladder during the tyre manufacturing process.

Another possibility for stretching the bladder comprises putting a rubber hose inside the bladder, inflating the hose with air or gas pressure, and stretching the bladder with the inflated hose in the same or in a similar way as it occurs with the bladder during the tyre manufacturing process.

Concerning the amount of air pressure inside the bladder or in the hose before the low pressure treatment, it has to be taken into account, that extra inflation owing to the low pressure in the vacuum chamber occurs.

The invention claimed is:

1. A method of treating a surface of an object comprising a rubber material, the method comprising:

subjecting the surface to a gas at a low pressure at which the gas is susceptible of forming a plasma, wherein the gas is a fluorine gas; and causing the gas to form a plasma, wherein the object is a bladder for use in a process for making a vehicle tyre, wherein the treatment is performed until there is obtained a surface layer of the rubber material with properties modified by the treatment having an expected lifetime corresponding to the expected lifetime of the object and where the bladder is in a stretched position during the plasma treatment.

2. The method according to claim 1, wherein the fluorine gas contains tetrafluormethane and/or hexafluorethane.

3. The method according to claim 1, wherein the treatment is performed until there is obtained a surface layer of the rubber material with properties modified by the treatment having an expected lifetime corresponding to the expected lifetime of the object.

4. The method according to claim 1, wherein the stretching is done by mechanical means.

5. The method according to claim 1, wherein the stretching is done by air or gas pressure inside the bladder.

* * * * *